(12) United States Patent
Fargier

(10) Patent No.: US 11,271,845 B2
(45) Date of Patent: Mar. 8, 2022

(54) METHOD OF COMMUNICATION IMPLEMENTED IN A HOME-AUTOMATION SYSTEM FOR A BUILDING AND ASSOCIATED HOME-AUTOMATION SYSTEM

(71) Applicant: SOMFY ACTIVITES SA, Cluses (FR)

(72) Inventor: Sylvain Fargier, Cluses (FR)

(73) Assignee: SOMFY ACTIVITES SA, Cluses (FR)

( * ) Notice: Subject to any disclaimer, the term of this patent is extended or adjusted under 35 U.S.C. 154(b) by 63 days.

(21) Appl. No.: 16/644,083

(22) PCT Filed: Sep. 3, 2018

(86) PCT No.: PCT/EP2018/073581
§ 371 (c)(1),
(2) Date: Mar. 3, 2020

(87) PCT Pub. No.: WO2019/043216
PCT Pub. Date: Mar. 7, 2019

(65) Prior Publication Data
US 2020/0322252 A1 Oct. 8, 2020

(30) Foreign Application Priority Data
Sep. 4, 2017 (FR) ...................................... 1758148

(51) Int. Cl.
*H04L 12/715* (2013.01)
*H04L 45/00* (2022.01)
(Continued)

(52) U.S. Cl.
CPC .......... *H04L 45/04* (2013.01); *H04L 12/2803* (2013.01); *H04L 41/0803* (2013.01);
(Continued)

(58) Field of Classification Search
CPC ......... H04L 45/00; H04L 45/04; H04L 45/16; H04L 45/74; H04L 45/745; H04L 61/20;
(Continued)

(56) References Cited

U.S. PATENT DOCUMENTS 8,230,026 B2 * 7/2012 Gilhuly ................... H04L 51/14
709/206
2007/0274286 A1 * 11/2007 Krishnan ................ H04L 69/22
370/351

(Continued)

OTHER PUBLICATIONS

Hinden et al., "IP Version 6 Addressing Architecture"; rfc4291.txt, Internet Engineering Task Force, IETF, Standard, Internet Society (ISOC), 2006, XP015054931.
(Continued)

*Primary Examiner* — Warner Wong
(74) *Attorney, Agent, or Firm* — Nixon & Vanderhye

(57) ABSTRACT

Disclosed is a communication method implemented in a home-automation system for a building including communicating elements including home-automation and network equipment, the communicating elements being connected to an unconfigured communication network, each communicating element utilizing a predefined communication protocol, and having physical and network addresses including a network prefix cut up into a plurality of addressing fields, at least one of which is not filled. The method includes steps, implemented by a first home-automation equipment item, of: receiving a message including a compressed header containing a first destination network address indication field and a second indication field indicating a fully compressed source network address; obtaining based on the header, without decompression of the source network address and/or of the destination network address, a recipient network element identified, and determining whether the first home-automation equipment item is the recipient; and (Continued)

processing the message as a function of the determination result.

13 Claims, 6 Drawing Sheets

(51) Int. Cl.
| | | |
|---|---|---|
| *H04L 12/28* | (2006.01) | |
| *H04L 41/0803* | (2022.01) | |
| *H04L 45/16* | (2022.01) | |
| *H04L 45/745* | (2022.01) | |
| *H04L 61/5069* | (2022.01) | |
| *H04L 69/04* | (2022.01) | |
| *H04L 69/22* | (2022.01) | |
| *H04L 101/622* | (2022.01) | |
| *H04L 101/659* | (2022.01) | |

(52) U.S. Cl.
CPC ............ *H04L 45/16* (2013.01); *H04L 45/745* (2013.01); *H04L 61/2069* (2013.01); *H04L 69/04* (2013.01); *H04L 69/22* (2013.01); *H04L 61/6022* (2013.01); *H04L 61/6059* (2013.01)

(58) Field of Classification Search
CPC ..... H04L 61/2069; H04L 69/00; H04L 69/04; H04L 69/22; H04L 12/2803; H04L 61/00; H04L 61/10; H04L 61/6018; H04L 61/60; H04L 61/6059; H04L 41/08; H04L 41/0803; H04L 41/0806; H04L 29/06; H04L 29/06102; H04L 29/0653; H04L 29/0863; H04L 69/161
See application file for complete search history.

(56) References Cited

U.S. PATENT DOCUMENTS

| | | | |
|---|---|---|---|
| 2009/0161547 A1* | 6/2009 | Riddle | H04L 69/161 |
| | | | 370/236 |
| 2009/0161581 A1* | 6/2009 | Kim | H04L 29/12216 |
| | | | 370/254 |
| 2018/0249562 A1* | 8/2018 | Rhodes | H05B 47/18 |
| 2020/0022022 A1* | 1/2020 | Ly | H04W 28/06 |

OTHER PUBLICATIONS

Hui et al., "Compression Format for IPv6 Datagrams over IEEE 802.15.4-Based Networks"; rfc6282.txt, Compression Format for IPv6 Datagrams over IEEE 802.15.4-Based Networks, Internet Engineering Task Force, IETF, Standard, Internet Society (ISOC), 2011, XP015081287.

International Search Report, dated Oct. 30, 2018, from corresponding PCT application No. PCT/EP2018/073581.

FR Search Report, dated Apr. 23, 2018, from corresponding FR application No. 1758148.

* cited by examiner

METHOD OF COMMUNICATION IMPLEMENTED IN A HOME-AUTOMATION SYSTEM FOR A BUILDING AND ASSOCIATED HOME-AUTOMATION SYSTEM

BACKGROUND OF THE INVENTION

Field of the Invention

The present invention relates to a communication method implemented in a home automation system for a building, and an associated home automation system.

More generally, the invention relates to the field of automation for buildings, as much for commercial use buildings as for residential use buildings, whether these be individual or collective buildings.

Description of the Related Art

There are numerous buildings provided with controllable equipment units designed to ensure performance of comfort and energy management functions, such as heating, ventilation and air conditioning, as well as the functions of lighting management, control of the opening elements, such as blinds or roller shutters placed in front of the windows in the building, or even remote arming of security systems by control-monitoring of closure and locking systems (doors, locks). Automation systems are the sets of rules that govern the control of electrical equipment units by means of a programmable supervision system, in order to ensure improved comfort for the occupants of the building or even to optimise energy consumption. These automation systems are controlled by a programmable supervision system, in order to ensure improved comfort for the occupants of the building or even to optimise energy consumption. The term "Technical Building Management" encompasses all of these applications or, more generally, the term "Building Automation Systems" as per the accepted terminology. In the residential sector, automation systems are more often referred to by the term "home automation". For the purposes of simplification, hereinafter, the term home automation will be used to refer to both residential as well as tertiary applications.

Typically, the equipment component units of a same given building are connected to a control unit, which has the function of supervising these equipment units and controlling the operation thereof. This connection is often operationally implemented by connecting the equipment units, by means of wired links, to a common data bus, such as a multipoint bus that allows a bidirectional connection, for example of the RS485 type. This data bus is connected to the control unit, in a manner so as to form a network which permits the exchange of data between the equipment units and the control unit.

However, such a situation has drawbacks.

On the one hand, it offers limited flexibility, since any modification after installation requires rewiring the network, whether for purposes of adding new equipment units or to modify the distribution thereof within the building. This entails the need to carry out work that can be long and costly and requiring the intervention of specialised technicians.

On the other hand, this known situation presents limits in terms of the number of devices that can be accommodated on the network. For example, the RS485 type solutions currently used have limited addressing capacities, for example allowing for the possibility to connect a maximum of 255 devices on a same given bus. This limit is prohibitive when it comes to equipping large buildings and/or buildings comprising a large number of equipment units to be managed. However, contemporary applications make it necessary to be able to manage a large number of equipment units and devices, for example in the context of the Internet of Things.

In addition, the architecture of these known networks can lead to the appearance of high latency times during communication between an equipment unit and the control unit. This is explained in particular by the fact that the control-command is centralised and that the information sent by the equipment units must revert back to the bus in order to be processed by the control unit. However, for certain applications, a latency time which is too high can be detrimental to the proper functioning of the equipment units.

In order to overcome these drawbacks, it is proposed to improve the home automation system by adding a hierarchical communication network architecture, thereby making it possible to manage a large number of equipment units and devices, each equipment unit being a communicating element of the home automation system, while also presenting significantly increased flexibility with respect to installation and modification.

The connection of the various equipment units in a home automation system is done during an installation phase, and it is common to effectuate the connections locally, by portions of a building, prior to installing the network equipment units, gateways and routers, which serve to enable a connection to the main network and a complete configuration of the network addresses thus allowing for the effective addressing of each communicating element of the network.

However, even in the installation phase, it is useful to communicate with the home automation equipment units already installed locally, prior to a complete configuration of the network.

The invention provides a solution to this problem, allowing for communications both in configured and unconfigured mode, prior to connection to the main network.

SUMMARY OF THE INVENTION

To this end, the invention relates to a communication method implemented in a home automation system for a building, the home automation system comprising a plurality of communicating elements comprising home automation equipment units and network equipment units, the communicating elements being connected to an unconfigured part of a communication network, each communicating element being designed so as to communicate according to a predefined communication protocol; and having a physical address and a network address comprising a network prefix divided into a plurality of addressing fields, at least one addressing field of which is not filled in, each network address additionally also containing a part of the physical address of the communicating element, the communication protocol using messages conveyed between a source home automation equipment unit and at least one destination home automation equipment unit, with each message including a header.

The method comprises the steps, operationally implemented by a first home automation equipment unit, consisting of:

receiving a message comprising a compressed header containing a first indication field of a destination network address and a second indication field indicating a fully compressed source network address;

obtaining from the header received, without decompression of the source network address and/or the destination network address, of a destination network element identifier, and determining whether the first home automation equipment unit is the recipient of the message;

processing of the message received as a function of the result of the determination.

Advantageously, the invention makes it possible to use the same given communication protocol for communicating, prior to configuration of the network address of a communicating element and after the configuration of this network address.

The communication method according to the invention may also have one or more of the characteristic features here below, taken into consideration independently or in accordance with all the technically acceptable combinations thereof.

The method comprises, prior to the processing step, a comparison step operationally implemented by the first home automation equipment unit, for comparing the destination network element identifier to a predetermined identifier stored by the first home automation equipment unit.

The received message header indicates an addressing mode from a point-to-point mode and a multicast mode, the method comprising an addressing mode determination step, and, when the addressing mode is of point to point type, the destination network address indication field indicates a fully compressed destination network address and, during the comparison step, the predetermined identifier is an interface identifier that identifies the first home automation equipment unit.

The fully compressed network address is an empty field, the destination network element identifier is deduced from the physical address of the destination home automation equipment unit and the interface identifier of the first home automation equipment unit is equal to the physical address of the first home automation equipment unit.

The method in addition includes a filtering step of filtering the message, with the filtering step being operationally implemented by a network equipment unit.

When the source home automation equipment unit is a configuration device, the message includes the configuration data in order to configure the first home automation equipment unit.

When the addressing mode is of the multicast type, the destination network element identifier is a first group address and the predetermined identifier is a second group address to which the first home automation equipment unit is subscribed.

The method includes a message communication step of communicating the message received in multicast mode without modification of the header fields relating to the destination network address and the source network address, the communication step being operationally implemented by a network equipment unit.

The communication step includes the formatting of the message header by an insertion of an indicator indicating a maximum number of hops between network equipment units that the message can perform.

The compressed source network address is an empty field.

After a connection from the unconfigured part of the communication network to a configured communication network, the preliminary steps:

requesting in order to obtain a network address for the first home automation equipment unit;

in the event of no response to the request, and prior to the obtaining of a network address of the first home automation equipment unit, communication using a full address compression mode, enabling the first home automation equipment unit to communicate with at least one second home automation equipment unit.

According to another aspect, the invention relates to a home automation system for a building that includes a plurality of communicating elements comprising home automation equipment units and network equipment units, the communicating elements being connected to an unconfigured part of a communication network, each communicating element being designed so as to communicate according to a predefined communication protocol and having a physical address and a network address comprising a network prefix divided into a plurality of addressing fields, at least one addressing field of which is not filled in, each network address additionally also containing a part of the physical address of the communicating element, the communication protocol using messages conveyed between a source home automation equipment unit and at least one destination home automation equipment unit, with each message including a header. The system is such that a first home automation equipment unit is arranged so as to:

receive a message comprising a compressed header, the header containing a first indication field of a destination network address and a second indication field indicating a fully compressed source network address;

obtain from the header received, without decompression of the source network address and/or the destination network address, a destination network element identifier, and determine whether the first home automation equipment unit is the recipient of the message;

process the message received as a function of the result of the determination.

BRIEF DESCRIPTION OF THE DRAWINGS

Other characteristic features and advantages of the invention will emerge from the description which is given here below, purely by way of information and without limitation, with reference made to the appended figures, among which.

DETAILED DESCRIPTION OF EMBODIMENTS

Figure 1:
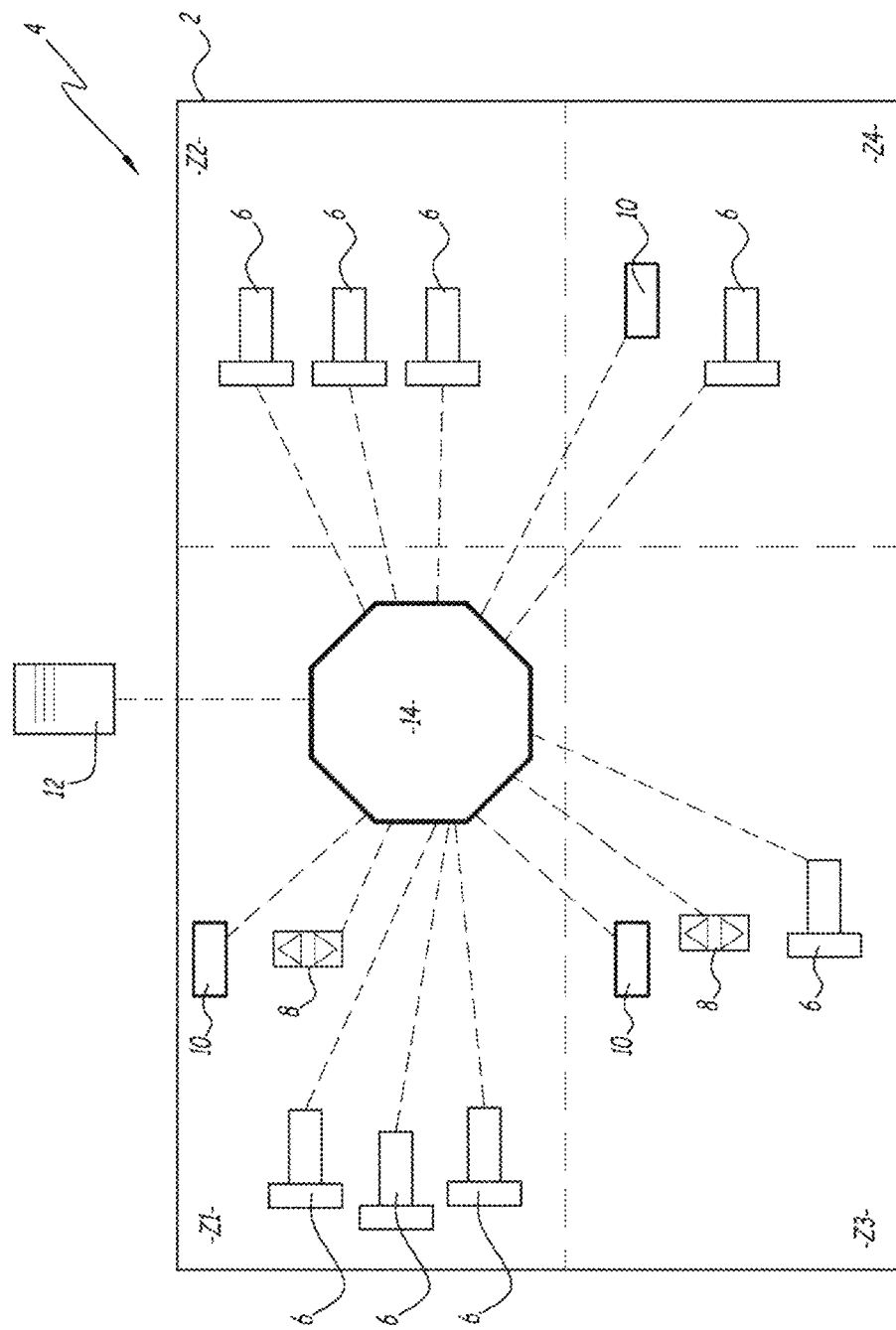
FIG. 1 is a schematic representation of a building comprising a home automation system according to one embodiment of the invention.

FIG. 1 represents a building 2, comprising of a plurality of zones Z1, Z2, Z3, Z4. The building 2 is equipped with a home automation system 4 which includes a set of home automation equipment units distributed in the zones of the building 2, as well as a control system for these home automation equipment units.

The home automation system 4 in this case is designed to enable and ensure the comfort and/or energy management functions of the building 2, such as heating, ventilation and air conditioning, as well as the functions of lighting management, control of the opening elements, such as blinds or roller shutters placed in front of the windows in the building 2, and/or security functions such as surveillance of the premises and the alarm system.

The set of home automation equipment units includes home automation equipment units such as controllable home automation equipment units 6, control points 8 and sensors 10.

The control system comprises in particular a programmable control unit 12 and a communication network 14, which is internal to the building 2, the communication network 14 being arranged so as to enable and support the communication of the home automation equipment units of the home automation system 4 with the control unit 12. The home automation equipment units of the home automation system 4 which are connected to this communication network 14 are, in the sections that follow, said to belong to the communication network 14.

The home automation equipment units and the control system in this case are connected to one or more sources of electrical power, not illustrated, in the building 2.

The zones of the building 2 correspond to spatial portions of the building 2 which are located within the interior and/or on the exterior of this building and which are intended to each accommodate a portion of the home automation equipment units of the home automation system 4.

For example, the zones of the building 2 correspond to the levels of the building 2, such as floors or basements or below-ground levels. These zones may also be rooms, groups of rooms in the building 2, possibly separated from each other by partitions, these rooms may be distributed within one or more levels of the building 2. These zones may also correspond to facades or parts of a facade like a part of a facade corresponding to a same given floor.

These zones are for example defined during the designing of the building 2 and/or during the designing and/or installation of the home automation system 4.

Preferably, the zones of the building 2 are distinct and separate from each other. However, by way of a variant, the zones of the building 2 may overlap and/or be nested within each other.

The building 2 may be an office complex, or a building for residential use, or a building for commercial or industrial use, or any combination of these uses. It may in particular be a stand-alone building or a detached house.

Thus, within the meaning of the present description, the term "home automation" is not limited to a purely domestic and residential use.

In this example, only four zones, here denoted as Z1, Z2, Z3 and Z4, are defined with reference to the building 2. However, in practice, this number may be different. It is in particular adapted according to the configuration of the building 2 and the functions of the home automation system 4.

In order to simplify FIG. 1, the zones Z1, Z2, Z3 and Z4 are illustrated schematically within the interior of a same given floor of the building 2.

Preferably, each controllable home automation device 6 comprises a controllable actuator that may be controlled by means of at least one control signal.

The controllable home automation devices 6 in this case are illustrated in an identical manner. However, there may exist differences among them and they may perform different functions within the home automation system 4.

For example, the actuator of the controllable home automation device 6 comprises an electric motor coupled with a mechanical load and arranged so as to move and/or adjust or regulate an element of the building 2.

According to one example, the mechanical load of the controllable home automation device 6 is a blackout shutter system, such as a panel, a blind or an opaque curtain, associated with at least one opening of the building 2, such as a window or a bay window. The movement of this blackout shutter system makes it possible to regulate the amount of sun light received by the building 2 through this opening.

According to another example, the mechanical load of the controllable home automation device 6 is a compressor that is capable of setting in operation an expansion-compression cycle of a heat-transfer fluid within a cooling system of the building 2, such as an air conditioner or a heat pump, in order to regulate the temperature within the interior of the building 2.

According to yet another example, the mechanical load of the controllable home automation device 6 is a pump or a fan intended to set in motion a volume of fluid within the building 2, for example for suctioning or blowing of air within a ventilation system, or for circulating water or a heat transfer fluid within a dedicated pipe.

By way of a variant, the actuator of the controllable home automation device 6 is able to operationally control an electrical switching device, in order to control the switching on and off of a light source, such as an array of neon or light-emitting diode lights and lamps, within the building 2.

The controllable home automation device 6 may also be lighting, for example, interior or exterior lighting or a lighting control system, an alarm system, or even a video camera, in particular a video surveillance camera.

Each control point 8 is intended to receive operational control instructions from a user of the building 2, with a view to controlling operation, directly or indirectly, of one or more of the controllable home automation devices 6 and/or for controlling operation of the control unit 12.

To this end, each control point 8 here includes a human-machine interface, not illustrated, comprising data input means, such as one or more switches and/or one or more push buttons and/or one or more rotary buttons and/or a tactile touch screen. The control point 8 may also include a connection interface for connecting thereto the external control means, for example one or more individual switches arranged around the control point 8 and being connected by a wired link to this control point 8.

The control points 8 may be in the form of a portable remote control associated with a fixed receiver or, by way of a variant, a fixed control terminal integrally secured to a wall of the building 2.

Each sensor 10 is designed to convert one or more physical quantities relating to the state of the building 2 or of its environment into one or more signals that are proportional to this physical quantity. This signal is, for example, an electrical signal, a light signal or a radio frequency signal. This signal may be transmitted by the sensor to be received by at least one home automation equipment unit and/or the control system, for example, the control unit 12.

One or more sensors 10, may be integrated into a controllable home automation device 6, into a control point 8, or even into the control unit 12. The home automation system 4 may also include one or more stand-alone sensors that are independent.

For example, the physical quantities measured by the sensors 10 are, without limitation, a temperature, for example a temperature of a wall or of the ambient air, a humidity rate, a luminosity value, a value of ambient air pressure, a value of consumption for example of water, gas or electricity, the state of opening of a roller shutter, the position of an opening element such as a window, whether or not motorized, or even the presence or absence of a user.

By way of an illustrative example, in FIG. 1, the zone Z1 comprises three controllable home automation devices 6, one control point 8 and one sensor 10. The zone Z2 comprises three controllable home automation devices 6. The zone Z3 comprises one controllable home automation device 6, one control point 8 and one sensor 10. The zone Z4 comprises one controllable home automation device 6 and one sensor 10.

Each home automation equipment unit of the home automation system 4, including in particular the controllable home automation devices 6, the control points 8, and the sensors 10, is connected to the control unit 12 by means of the communication network 14 and for this purpose comprises a network interface 40 for connecting to this communication network 14. The control unit 12 also includes a network interface 40.

For example, each controllable home automation device 6 receives the control signals via the communication network 14. Each control point 8 transmits the operational control instructions received via the communication network 14. Each sensor 10 sends the measured information items via the communication network 14.

The communication takes place according to a given communication protocol.

For example, the communication takes place by an exchange of messages, for example in the form of packets, with these messages each containing a header, which includes a destination of the message, and useful data items, such as a command order or a value of a physical quantity measured by a sensor.

Preferably, the communication protocol used is an IP protocol ("Internet Protocol"), for example the Internet Protocol version 6 (IPv6). By way of a variant, the communication protocol is the Internet Protocol version 4 (IPv4).

Figure 2:
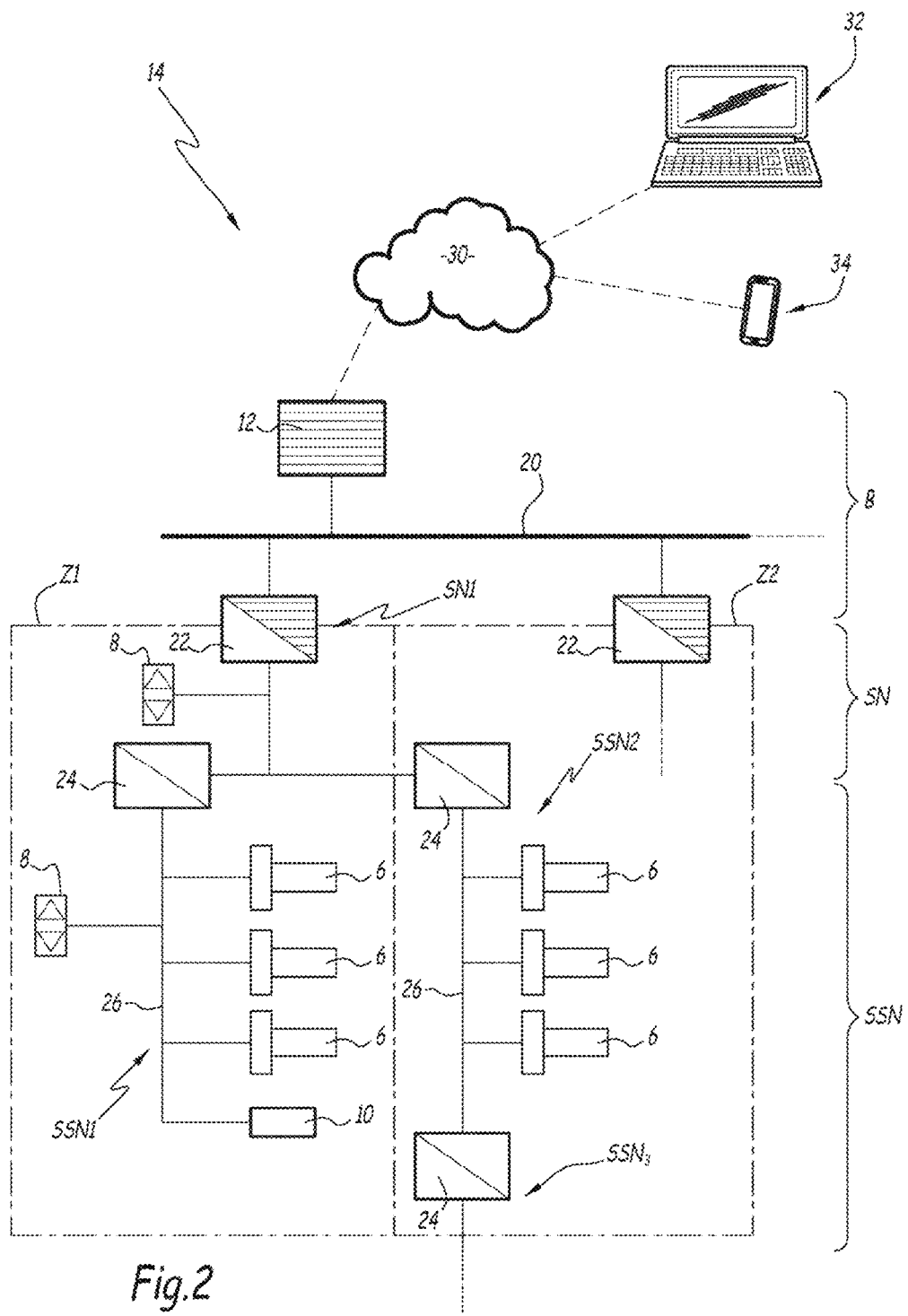
FIG. 2 is a schematic representation of a hierarchical communication network for connecting the equipment units of a home automation system in one embodiment.

FIG. 2 represents in greater detail the example of the communication network 14 shown in FIG. 1. In order to facilitate the reading of this FIG. 2, the home automation equipment units and devices 6, 8, 10 associated with the zones Z3 and Z4 of the building 2 are not illustrated therein.

The communication network 14 is a hierarchical network having several hierarchical levels, also referred to as rank. It includes a main network B, which in particular comprises a common data bus, forming a back-end physical link 20, also referred to as a "backbone" per the accepted terminology, to which the control unit 12 is connected.

For example, the backbone or back-end physical link 20 is a wired link of the Ethernet type (IEEE 802.3 standard), for example Ethernet 100 Mbit/s or higher.

The communication network 14 also comprises at least one sub-network (or subnet), generically denoted by the reference SN. This sub-network includes a network equipment unit 22, 24, which is directly connected to the backbone link 20 by means of a network interface 40 and which forms the head-end of this sub-network SN.

It may be an interconnecting network equipment unit, also referred to as gateway 22, intended to interconnect two parts of separate and distinct networks, for example, based on different technologies. It may also be a router 24 when the main network B and the sub-network SN are identical in nature.

The term 'router' refers to a hardware and software tool that forms an intermediate element in a network and directs the data, for example in the form of data packets, between one and more parts of the network. The direction provided to the data, or routing, is carried out in accordance with a set of rules that form a routing table.

The term 'gateway' refers to a particular router, which in addition to routing functions, also has the function of translating the messages circulating over the network, insofar as the physical means and/or the protocols differ between two parts of the network.

In other words, the network equipment units router and gateway fulfill the role of enabling the passing through of the data packets transiting from one network interface 40 to another in accordance with a set of rules that make up a routing table.

In the example shown in FIG. 2, two gateways 22 are connected to the backbone link 20, thereby forming two separate sub-networks SN1 and SN2. Only one of these two sub-networks, bearing the reference SN1, is described in the following.

By way of a variant, the number of sub-networks SN may be different.

The sub-networks SN are directly connected to the main network via gateways, and have an associated first rank in the hierarchical network.

Each sub-network SN contains at least one home automation equipment unit 6, 8, 10 of the home automation system 4, connected to the corresponding gateway 22 via a physical link 26, preferably wired.

The communication network 14 in addition includes sub-sub-networks (or sub-subnets) having a rank lower than that of the sub-networks SN, and are denoted in a generic way by the reference SSN.

Each sub-sub-network SSN includes a network equipment unit, advantageously a router 24, that connects it to a sub-network SN or to a sub-sub-network having a hierarchical level higher than its own. The network equipment unit 22, 24 forms the head-end of this sub-sub-network SSN.

With reference to the example in FIG. 2, if a rank "n" is associated with the sub-network SN1, each sub-sub-network SSN1 and SSN2 has an associated rank "n−1", and the sub-sub-network SSN3 has a rank "n−2".

Each head-end router 24 of sub-sub-network of rank "n−1" is connected to a gateway 22 via a physical link 26, preferably wired.

When the communication network 14 has several hierarchical levels, each head-end network equipment unit 22, 24 of sub-sub-network of rank "n−k", with k greater than or equal to 2, is connected to a router 24 of higher rank "n−k+1", via a physical link 26, preferably wired.

In one embodiment, the hierarchical network may include up to twelve hierarchical levels, including the level of the main network B.

Each sub-sub-network SSN comprises one or more home automation equipment units and devices 6, 8, 10, connected to the corresponding router 24 via a physical link 26, with each home automation unit being connected to the physical link 26 by means of their respective network interfaces 40.

Home automation equipment units connected, via a same given physical link 26, to a same given router 24 is in this case said to be part of a same given local sub-network.

Preferably, the sub-networks SN and each sub-sub-network SSN having a rank lower than that of the sub-network SN are each associated with a zone of the building 2. A sub-network SN and/or a sub-sub-network SSN is said to be "associated" with a zone Z1, Z2, Z3, Z4 of the building 2 when the home automation equipment units and devices 6, 8, 10 belonging to this sub-network are themselves associated with this zone, for example because they are physically located within the interior of this zone Z1, Z2, Z3, Z4 of the building 2.

The number and structure of the sub-networks SN and the sub-sub-networks SSN, as well as their association with the zones of the building 2, are preferably chosen according to the configuration of the building 2 and the functionalities fulfilled by the home automation system 4.

Preferably, the physical link 26 which connects the network equipment units 22, 24 to each other and which connects them to the home automation equipment units and devices 6, 8, 10 is an RS485 type multipoint serial data bus.

The use of a physical link 26 of RS485 type presents advantages in this communication network 14, because it makes it possible to use data buses of very long length, for example up to 1 km in length, without too significantly degrading the quality of the signal that circulates therein. Limiting the number of home automation equipment units and devices 6, 8, 10 and/or network equipment units 22, 24 connected on a same given physical link 26 does not have a penalising effect, thanks to the hierarchical architecture which makes it possible to connect a large number of sub-networks.

In FIG. 2, the gateways 22 are network equipment units for interconnection between an Ethernet data bus and an RS485 bus.

On an optional basis, the control unit 12 is adapted so as to be connected to an external data network 30, such as the internet network, independently of the communication network 14.

In this way, the control unit 12 can communicate with a remote computer server connected to this external network 30, for example in order to send reports on the operating state of the home automation system 4 for diagnostic purposes, or even to receive operational control instructions. The control unit 12 can also communicate via the external network 30 with one or more remote users, for example, who are equipped with a communication terminal such as a computer 32, an intelligent mobile telephone device, that is to say "smartphones", a touchscreen tablet or other any equivalent equipment units.

The communication network 14 is adapted so as to operate according to a predefined communication protocol, such as the Internet protocol IP, in order to ensure communication between the communicating elements of the home automation system 4 which are connected to this communication network 14.

In the preferred embodiment, the communication protocol used is the IPv6.

This communication protocol is operationally implemented here by making use of the network interfaces 40 which equip the various home automation equipment units and devices 6, 8, 10 and the network equipment units 22, 24 of the home automation system 4 which are connected by the communication network 14, in particular thanks to their network interface.

Hereinafter, the generic term "communicating element" will be understood to refer to the network equipment units 22, 24 and the home automation equipment units and devices 6, 8, 10.

The routers 24 and the one or more gateway/s 22 comprise specific network interfaces. For example, these network interfaces each implement a protocol stack, that is to say a stack of protocol layers, each protocol layer relying on those below it in order to provide additional functionality.

Figure 3:
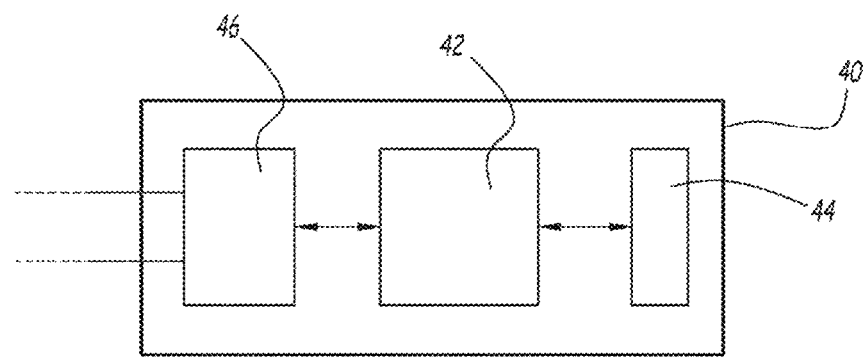
FIG. 3 is a schematic representation of a network interface for a home automation equipment unit belonging to the communication network shown in FIG. 2.

FIG. 3 schematically represents the network interface of a communicating element. The function performed by the network interface of a communicating element is to connect this communicating element to one or more communication networks. It thus enables the communicating element to communicate with the other communicating elements of the one or more network/s to which it is connected.

As illustrated in FIG. 3, each network interface 40 includes a network controller 42, a memory storage 44 and an input-output module 46, also referred to as a "transceiver" as per the accepted terminology, the input-output module 46 being here provided with a connector arranged so as to physically connect the input-output module 46 to a physical layer of the communication network 14.

In this example, the physical layer of the communication network 14 is partly formed by the physical links 26.

The network controller 42 includes an electronic computer, for example one or more data processors, microprocessors or any other equivalent means, programmed so as to perform the processing of the data passing through the communication network 14 and through the connector of the input-output module 46.

For example, the network controller 42 is programmed so as to automatically process the data received by the input-output module 46 and being forwarded to the network interface 40. The processing may for example consist in extracting and decoding the content of packets received by the network interface and/or transmitting this content to the home automation equipment units with which it is associated.

Additionally in a complementary fashion, the network controller 42 is programmed so as to automatically prepare the data sent by the home automation equipment units with which it is associated, with a view to sending it to one or more home automation equipment units connected to the communication network 14.

Finally, the network controller 42 is capable of operationally implementing the program code instructions to be used in order to execute the steps of the communication method according to the invention.

The memory storage 44 in this case contains a network address 50, a part of the network address or at least one identifier, which makes it possible to identify in a unique fashion the network interface 40 on the communication network 14 and which therefore identifies the corresponding home automation equipment units on the communication network 14. The network interface 40 in this case is compatible with the IPv6 standard, that is to say capable of operationally implementing the network protocol IPV6.

In addition, the memory storage 44 advantageously contains the executable program code instructions necessary for performing the operation previously described for the network controller 42.

Figure 4:
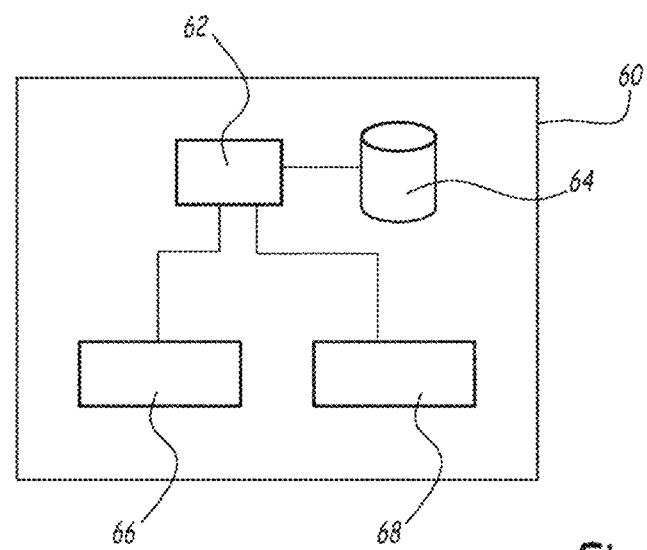
FIG. 4 is a schematic representation of a network equipment unit belonging to the communication network shown in FIG. 2.

FIG. 4 schematically represents a generic network equipment unit 60 intended to be used in the communication network 14. The generic network equipment unit 60 corresponds for example to a gateway 22 or to a router 24.

This network equipment unit 60 includes a programmable computing device 62, comprising one or more data processors, a memory storage 64, a first network interface 66 and a second network interface 68. The first network interface 66 is for example intended to be connected to a first sub-sub-network, while the second network interface 68 is intended to be connected to a second sub-sub-network, having a rank lower than that of the first sub-sub-network. The first and second network interfaces 66, 68 are, for example, each physically similar to the interface 40 described with reference to FIG. 3.

Each network interface of the network equipment unit 60 comprises at least one network address 50 which will be described in greater detail here below.

The programmable device 62 is capable of operationally implementing the programme code instructions to be used in order to execute the steps of the communication method according to the invention. These programme code instructions may, for example, be saved and stored in the memory storage 64 of the network equipment unit.

The programmable device 62 is additionally also programmed so as to ensure the routing of the data packets arriving from the part of the network associated with one or the other of the first and second network interfaces 66, 68, to a part of the communication network 14 connected to the other network interface 66, 68, based on the destination of these data packets. To this end, the equipment unit 60 here includes a routing table, for example recorded in the memory storage 64. This routing table contains the list of all the known routes of the communication network 14.

For example, if the embodiment of FIG. 2 were to be referred to, in the case of a router 24, the first and second network interfaces 66, 68 here are compatible with the RS485 type data buses.

A gateway 22 has an operation similar to that of the network equipment unit 60 described here above, except that one of the two network interfaces 66, 68 is connected with the backbone link 20.

By way of a variant, a network equipment unit 60 has one network interface 66 intended for an upstream connection (or "uplink" as per the accepted terminology) with a network equipment unit having a hierarchical level higher than that of the network equipment unit 60, and a plurality of interfaces 68 intended for downstream connections (or "downlink" as per the accepted terminology) with network equipment units having a hierarchical level lower than that of the network equipment unit 60.

The communication protocol used by the communication network 14 makes it possible to ensure the addressing of the messages exchanged between the elements of the home automation system 4.

For example, when a first communicating element of the home automation system 4, such as a control point 8, is to send data to a second communicating element of the home automation system 4, such as a controllable home automation device 6, then the first communicating element (referred to as 'source') generates a message containing the data to be sent and containing the address of the second communicating element (referred to as 'destination'). The message is thus routed within the communication network 14 of the source communicating element until it reaches the one or more destination communicating element/s.

More precisely, a message exchanged between the communicating elements of the network belonging to a same given local sub-network or to a same given local sub-sub-network travels through by means of the physical link 26 to which the communicating elements of the network are connected. A message exchanged between the communicating elements of the network not belonging to the same given local sub-network or to the same given local sub-sub-network is routed by means of the router 24 at the head-end of the local sub-network to which the source communicating element is connected, which redirects it to the sub-network to which each destination communicating element is connected, possibly via the network equipment units 22 and the backbone link 20.

Each network equipment unit 22, 24 and each communicating element 6, 8, 10 of the communication network 14 has at least one network interface 40 having a network address 50.

Hereinafter, the network address 50 of the network interface 40 of a communicating element will be assimilated to the network address 50 of this communicating element.

Figure 5:
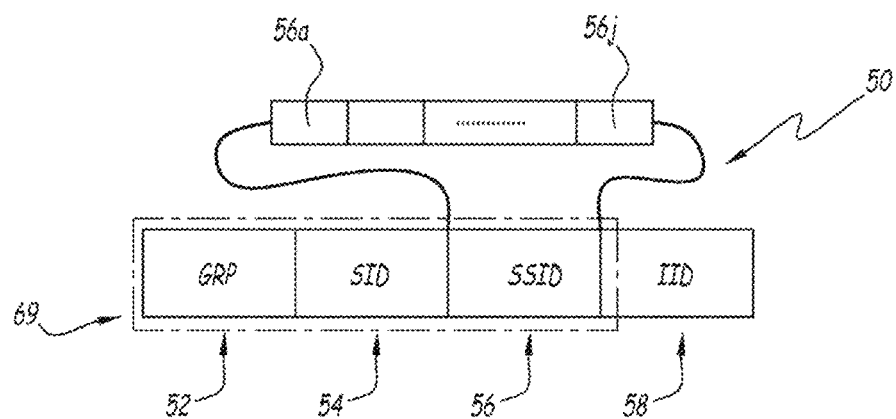
FIG. 5 is a schematic representation of an example of network address structure for identifying the communicating elements of a hierarchical communication network.

FIG. 5 schematically represents an example of network address of the type point to point ("unicast" as per the accepted terminology) that provides the ability to define in a unique manner a communicating element.

The network address 50 comprises a plurality of address fields respectively referenced as 52, 54, 56 and 58, the address fields corresponding to different and successive hierarchical levels of the hierarchical communication network 14.

The address field referenced 52, associated with the highest hierarchical level of the communication network 14, contains a site prefix GRP for "Global Routing Prefix", which identifies the communication network 14 as a whole. Typically, a single unique site prefix GRP is assigned to the home automation system 4 of a building 2.

The site prefix GRP is preconfigured manually in all the network equipment units 22, 24 intended to be connected on the backbone link 20. It may be saved and stored in a memory storage 64 of the network equipment units 22, 24, for example, a memory storage 44 of its network interface 40. The site prefix GRP can only be modified manually. It corresponds to the highest hierarchical level in the communication network 14.

The address field referenced 54 contains an identifier for the sub-network SID for "Sub-net IDentifier", which identifies the sub-network SN having a rank n, n being a non-zero integer, to which the communicating element considered belongs. Each sub-network SN connected to the backbone link 20 corresponds to a different sub-network identifier SID.

The address field referenced 56 contains an identifier for the sub-sub-network SSID for "Sub-Subnet IDentifier", which identifies the sub-sub-network SSN having a rank lower than n to which the communicating element considered belongs.

Finally, the address field 58 contains an identifier for the interface IID for "Interface IDentifier", corresponding to the unique identifier of the network interface 40 of the communicating element considered. In one embodiment, it is the MAC address, also referred to as physical address, which uniquely identifies each network interface 40 of a communicating element. This identifier is assigned to the network interface 40 at the time of its manufacture. It can for example be saved and stored in a memory storage 44 of the network interface 40. According to another embodiment, the address field 58 corresponding to the interface identifier IID may be entered at the time of manufacture of the network interface.

The network address 50 is associated with a network mask for distinguishing the network prefix and the machine address. Here the machine address is the interface identifier IID. The network prefix includes the site prefix GRP, the sub-network identifier SID, and the sub-sub-network identifier SSID.

When the communication protocol used is the Internet Protocol version 6 (IPv6), the network address 50 of a communicating element 6, 8, 10, 22, 24 comprises a total of 128 bits, that is to say 16 bytes. For example, the number of bytes allocated to each of the address fields 52, 54, 56 and 58 is 48 bits, 16 bits, 40 bits and 24 bits, respectively. In addition, the address field 56 corresponding to the sub-sub-networks is typically divided into address subfields 56a to 56j, making it possible to identify several layers of sub-networks. Each addressing subfield corresponds to a different hierarchical level of the sub-sub-network SSN. According to one mode of implementation, the address field 56 corresponding to the sub-sub-networks may include ten address sub-fields.

When the communication protocol used is the Internet Protocol version 4 (IPv4), the network address has a total of 32 bits, that is to say 4 bytes.

A network address 50 is completely configured when all of the different address fields 52, 54, 56 and 58 are filled in, according to the hierarchical level of the sub-network to which the communicating element considered belongs.

However, the complete configuration of a network address 50, and in particular of the network prefix, requires knowing the topology of the communication network, and, for a communicating element to be connected as a network node, knowing the addresses of the communicating elements with a higher hierarchical level than that of the communicating element considered in the hierarchical network.

By way of example, in one phase of installation of a home automation system, certain parts of the communication network 14 may not be configured. This may be the case when one or more gateways 22 are not connected to the backbone link 20 and/or when one or more routers 24 are not connected to a part of the communication network that is already configured. In these cases, the network addresses of the various communicating elements belonging to the part of the network that is not configured are incomplete and no communication is possible.

According to a particular feature of the invention, prior to the connection of an unconfigured part of the communication network to a backbone link 20 or to another already configured part of the communication network, the communicating elements belonging to the unconfigured part of the communication network are able to communicate in layer 3 of the OSI model (for "Open Systems Interconnection" as per the accepted terminology), or network layer, in a particular communication mode referred to as unconfigured mode thanks to the implementation of the communication method according to the invention. This is made possible in particular by the fact that a part of the network address of each communicating element is derived from its physical address.

Figure 6:
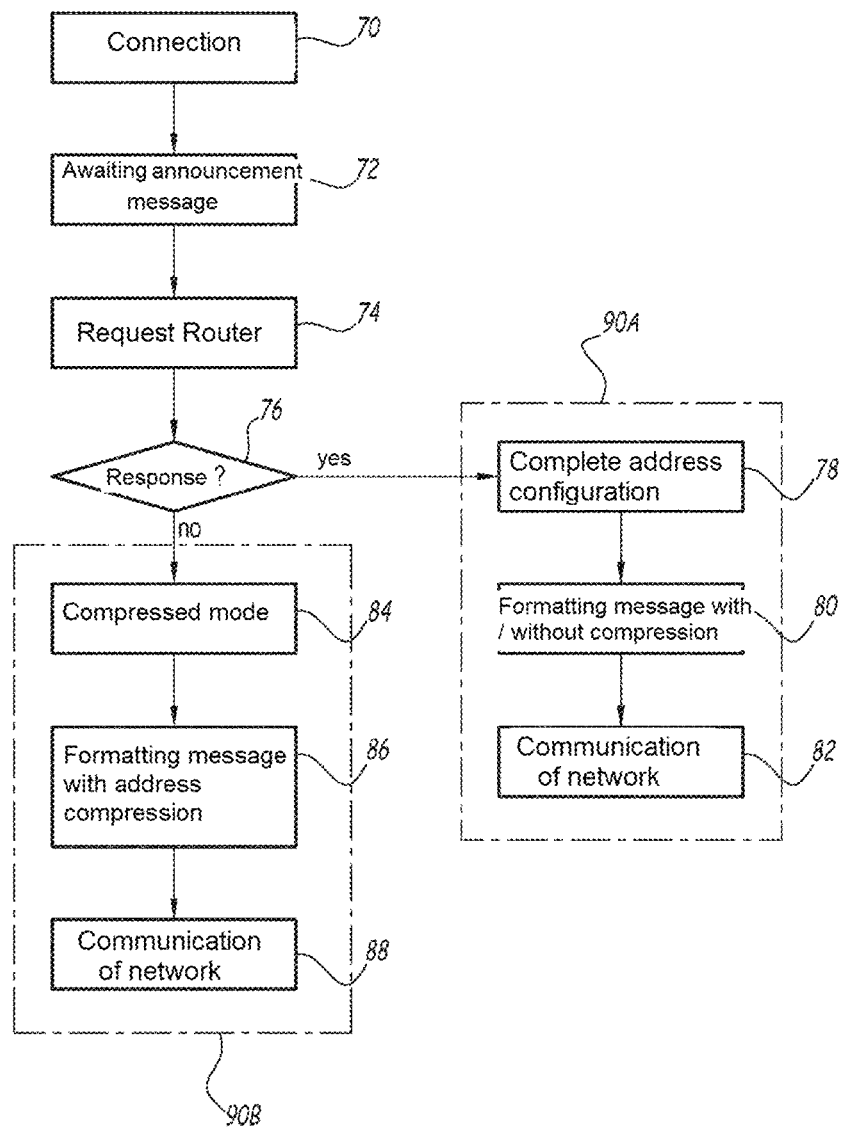
FIG. 6 is a flow chart of the connection steps for connecting an unconfigured part of a communication network to another part of the communication network that is already configured, or to a backbone link 20.

FIG. 6 is a flow chart of the main connection steps for connecting an unconfigured part of a communication network to another part of the communication network that is already configured or to a backbone link 20.

In a first step 70, a home automation equipment unit or device 6, 8 or 10 comprising a network interface 40, that forms a communicating element E1, is connected to the communications network 14.

In one phase of installation of the home automation system, it is possible that the network is not entirely wired, and therefore certain network equipment units, router 24 or gateway 22, are not connected.

In practice, the communicating element E1 is connected to a physical link 26, to which several home automation equipment units may be connected, thus forming a local sub-network.

The connection 70 is followed by a request phase for requesting to be provided a network address for the communicating element E1. This request phase comprises the steps 72 to 76 as described here below.

The connection step 70 is followed by a first waiting step 72, of waiting for a predetermined wait time, for an address announcement message announcing the network address originating from a router 24 or a gateway 22 situated upstream in the hierarchical network, which comprises the network identifiers GRP, SID or SSID that provide the means to form the network address 50 of the communicating element E1.

Absent the reception of any network address announcement message, the communicating element E1 can optionally send a request 74 for a router network address forwarded to the network equipment units situated upstream in the hierarchical network.

A response is awaited during a second waiting step 76, over a predetermined wait time.

In the event a response is received, the communicating element E1 is able to communicate in a configured communication mode 90A.

To this end, the communicating element E1 performs a configuration step 78 of configuring its network address 50, the response obtained making it possible to fill in the address fields 52, 54, 56 that form the network prefix of the network address 50. Optionally, the address configuration step 78 implements a network address negotiation, in accordance with the communication protocol implemented.

Thereafter, the communicating element E1 is capable of formatting the messages (step 80) for communications 82 in configured mode with any communicating elements that are already connected to the network 14.

It should be noted that communication in configured mode can use any mode of address compression from among the modes described in detail here below.

In the event of absence of any response received during the second waiting step 76, the communicating element E1 finds itself unable to configure its network address. Such a situation arises in particular when the local sub-network to which the communicating element E1 belongs is not yet connected to the main network via a gateway 22 or when it is not connected to an already configured part of the communication network via a network equipment unit such as a router 24.

According to a particular feature of the invention, the communication using the same communication protocol, in unconfigured mode 90B, is nevertheless made possible between communicating elements belonging to a same given local sub-network.

If there is no response, the step 76 is followed by a communication set up step 84 for setting up communications using an address compression mode, with or without omitting an identifier, as described here below.

Figure 7:
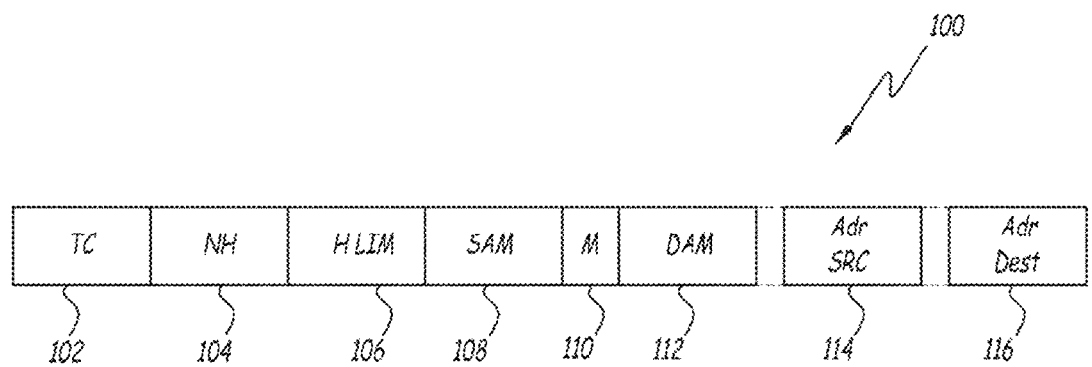
FIG. 7 is a schematic representation of a message header transmitted in one embodiment.

According to one mode of implementation, the messages have a header 100 of 2 bytes as illustrated schematically in FIG. 7.

The message header includes several fields of predetermined sizes.

The field 102 includes 3 bits that are suitable to indicate the traffic class TC. This field is used here in a conventional manner.

The field 104 includes 3 bits that are suitable to indicate the type of the next header NH, also used in a conventional manner.

The field 106 includes 5 bits that are suitable to indicate the maximum number of "hops" HLIM between network equipment units that it is permissible for a packet to perform. The value of this field 106 is decremented by one, by each network equipment unit that the packet transits through. A maximum value "Max Hop Limit" allows for covering the entire network.

The field 108, which is a source network address indication field, includes a compression mode indicator for the address of the source communicating element of the message, with length equal to 2 bits in this mode of implementation. This field is referred to as SAM for "Source Address Mode".

According to one embodiment, the field SAM can take the value "00", which indicates communication without compression in which the complete network address of the source communicating element is transported in the header of the message.

The field SAM can take the respective values "01" and "10" which indicate a partial compression of the network address of the source communicating element. In partial compression modes, a portion of the bits for the network prefix associated with the network address is carried in the message header, and the other part of the network address of the source communicating element is omitted. During decompression, the part of the network address that is omitted is deduced from the context of the network interface on which the message is received. The term 'context' here is used to refer to the network prefix associated with the network address of the network interface of the network equipment unit (22, 24) on which a message is either received or transmitted. The network prefix, includes address fields filled in, of the network interface of the network equipment units (22, 24) considered. The use of a network interface context assumes that the communicating element is plugged into a fully configured part of the network.

The field SAM can also take the value "11", indicating a full compression of the network prefix of the source communicating element. In this case, only the Interface identifier IID is transmitted. According to one particular mode of implementation, the entirety of the network address of the source communicating element is omitted. This is the full address compression mode with omission of identifier.

The field 110 of the header 100 comprises of 1 bit, denoted as M, that is suitable to indicate an addressing mode from the modes point-to-point (or "unicast" as per the accepted terminology) and multipoint (or "multicast" as per the accepted terminology). This latter addressing mode is also referred to as multicasting mode.

For example, M=0 corresponds to a "unicast" type communication and M=1 to a "multicast" type communication.

In a known manner, a "unicast" type communication is sent to a given recipient, while a "multicast" type communication is sent to a group of recipients, thus with all communicating elements subscribed to this group of recipients consequently being recipients of the message.

In one embodiment, a predetermined global group is defined. By default, all the communicating elements of the communication network 14 are subscribed to this global group. It is thus possible to carry out "multicast" type communications to be forwarded a priori to all of the communicating elements of the network using this global group.

The field 112, which is a destination network address indication field, comprises a compression mode indicator for the destination address, of length equal to 2 bits, indicating a compression mode applied to the network address of the one or more communicating element/s to be recipient/s of the message, referred to as DAM for "Destination Address Mode".

When the message is a point-to-point message (M=0), analogously to the field SAM, the field DAM can take the value "00" indicating absence of compression, the values "01" or "10" indicating partial compression, and the value "11" indicating full compression of the network address of the destination communicating element.

When the field DAM takes the value "11", the network prefix of the network address of the destination communicating element is omitted and only the interface identifier IID is transmitted.

In a manner analogous to the field SAM, in a full address compression mode with omission of identifier, the entirety of the network address of the source communicating element can be omitted.

In a manner analogous to point-to-point mode, in a multicast addressing mode, the field DAM can take the values "00" to "11", indicating respectively absence of compression, partial compression and full compression of the network address of the destination communicating element. However, in this addressing mode, the compression mode does not depend on the topology of the communication network.

The header 100 also includes a field 114 containing the network address of the source communicating element, of variable length and which may be empty, as a function of the compression mode indicated in the source network address indication field 108.

The header 100 also includes a field 116 containing the network address of the destination communicating element, that is of variable length and can be empty, depending on the compression mode indicated in the destination network address field 112.

When a part of the communication network is not configured, communication between the communicating elements belonging to this part of the communication network is possible, in a very limited manner, according to an addressing mode of the type point-to-point or multipoint. In order for this communication in layer 3 of the OSI model to be possible even if this layer is not configured, the unconfigured communicating elements are arranged so as to not reject the messages containing incomplete source and/or destination network addresses. The communicating elements know that they are not configured. For example, a Boolean indicator (flag) is maintained at FALSE as long as part of their network address, for example an address field for the network prefix, is not completed.

In the embodiment described with reference to FIG. 6, for any message sent, the formatting 86 of the message header comprises the setting to "11" of the respective fields SAM 108 and DAM 112. When the message is sent in point-to-point mode, the network prefix for the addresses of the source communicating element and the destination communicating element is omitted.

The message formatting also includes indication of the addressing mode between point-to-point mode and multicast mode.

The formatting step is followed by a communication step 88 for communicating the messages comprising the formatted header and useful data, the processing of the messages being output by the one or more destination communicating element/s as explained in more detail here below.

In point-to-point mode, the communication is very limited, it is only possible between two communicating elements connected to a same given physical link 26.

Each message includes a header comprising in particular the network address of the source communicating element and that of the destination communicating element in the form of a point-to-point type network address as illustrated in FIG. 5. In this communication mode, the network prefix not being known, the full address compression mode for the network address of the source communicating element and for the network address of the destination communicating element is imposed. Only the Interface identifiers IIDs of the source and destination communicating elements are transmitted in the header. Thus, the compressed part of the network address corresponds to that which is not yet known.

According to one variant of the implementation mode, the interface identifier of each communicating element is chosen to be equal to the MAC address of the communicating element considered.

Figure 8:
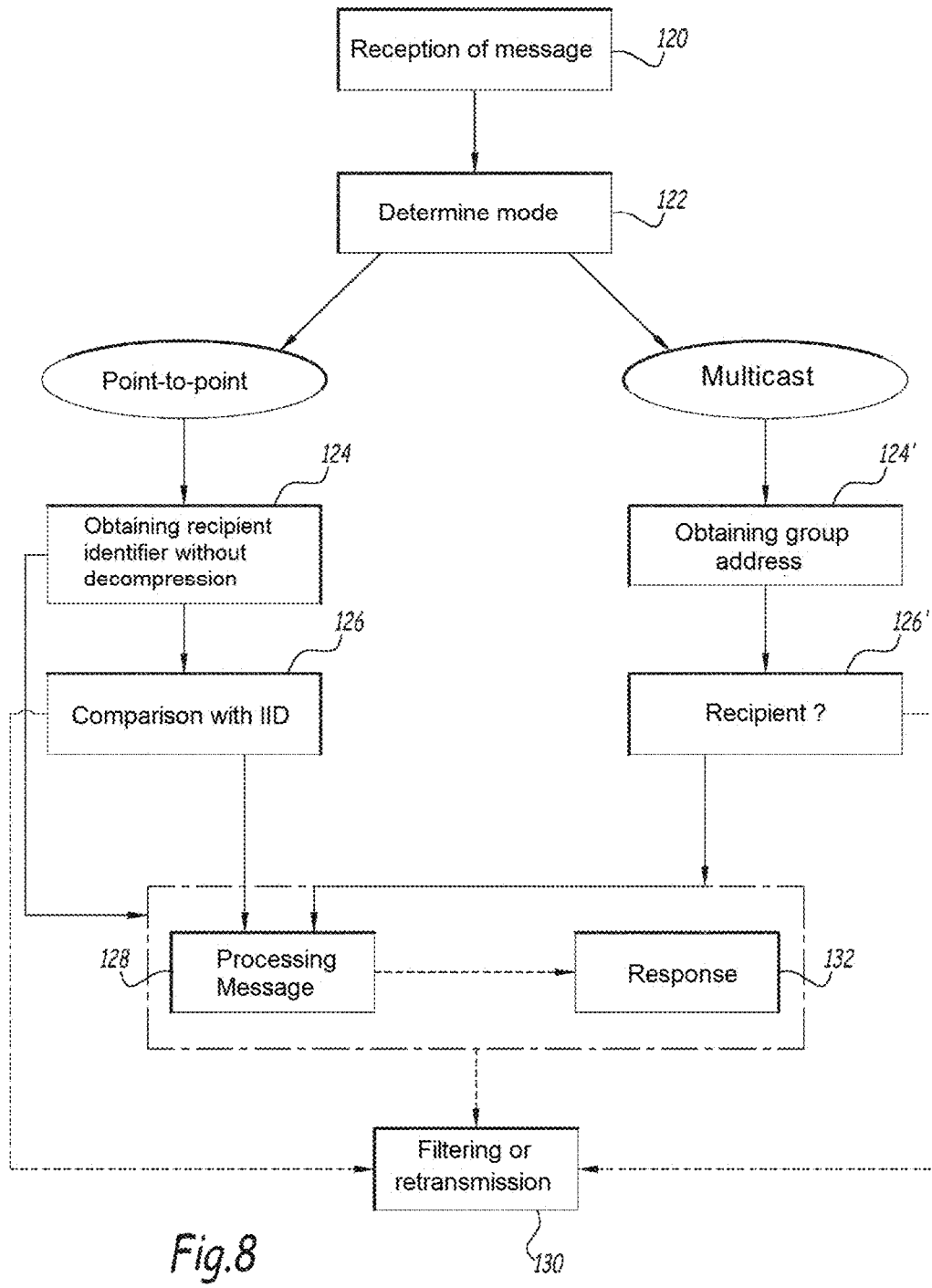
FIG. 8 is a flow chart of the reception steps for receiving a message by an unconfigured network element according to one embodiment.

The reception of a message by a receiving home automation equipment unit belonging to an unconfigured part of the network is described here below, in one mode of implementation, with reference to FIG. 8.

The receiving home automation equipment unit is for example a communicating element or a network equipment unit.

After the reception 120 of a message, the receiving communicating element, here referred to as the first communicating element, extracts 122 from the header of the message the addressing mode indicator among the point-to-point and multicast modes.

The message header is compressed because the source and, if applicable, destination, network address compression mode is implemented.

In point-to-point mode, the first communicating element implements an identifier obtaining step 124 of obtaining an identifier of the destination network element.

In order to do this, the communicating element determines whether the compressed destination address includes an identifier, in other words whether the full compression mode with or without identifier omission was used in the transmission.

If the full compression mode without omission has been used, the header of the received message includes an interface identifier, in the field 116 comprising the network address of the destination communicating element. This interface identifier is extracted in the step 124. The extraction is therefore obtained without decompressing of the network address.

Then, in the comparison step 126, the extracted interface identifier is compared with the interface identifier IID saved and stored in a memory storage 44 of the network interface of the first communicating element. In other words, the first communicating element checks and verifies that its interface identifier corresponds to the compressed destination address.

It is to be noted that the compressed destination address is used without decompression.

The message also includes a compressed source address.

When the result of the comparison is positive, that is to say when the interface identifier IID is identical to the extracted interface identifier, the first communicating element deduces therefrom that it is the recipient of the message. The comparison step 126 is followed by a processing step for processing the message 128.

When the result of the comparison is negative, the first element is not the recipient of the message. The comparison step 126 is followed by a filtering or retransmission step 130 of filtering or retransmission of the message described here below.

According to one particular mode of implementation of the communication method, the message has been formatted with a full address compression mode with omission of identifier.

In this mode, all the address fields of the network addresses of the source communicating element and/or of the destination communicating element are omitted. The missing field, namely the Interface identifier IID, is deduced from the physical address. This is made possible by the fact that the network address of each communicating element contains a part which is derived from the physical address (or MAC address for "Media Access Control") of the communicating element. The compression is maximum, the information being in layer 2 of the OSI model also referred to as link layer.

In this mode, the field 116 comprising the network address of the destination communicating element an interface identifier is empty.

The obtaining 124 of a destination network element identifier comprises the extracting of the MAC address of the destination communicating element from the layer 2 of the OSI model or link layer.

Thereafter, in the comparison step 126, the extracted MAC address is compared with the interface identifier IID saved and stored in a memory storage 44 of the network interface of the first communicating element. In other words, the first communicating element verifies that its interface identifier corresponds to the compressed destination address.

When the first communicating element is an unconfigured network equipment unit 22, 24, in a point-to-point addressing mode, in a preferential manner, this unconfigured network equipment unit 22, 24 is arranged so as to filter all the messages it receives. The term "filtering a message" here is understood to refer to the blocking of the message, and therefore the non-retransmission of the message to another part of the network.

Due to the full compression of the network addresses of the source and destination communicating elements, the network equipment unit considers that the message has a limited range at the physical link. Thus, all the messages sent in point-to-point mode to a physical link 26 are blocked by the network equipment unit and remain on this physical link.

According to one variant embodiment, the unconfigured network equipment units may be arranged so as to not filter any message and therefore to transmit on one port all the messages that they receive on the other port. They thus behave like a concentrator (or "hub" as per the accepted terminology). In this variant, communication over the entire communication network 14 becomes possible. However, a problem arises if two communicating elements have a same given interface identifier. In effect in this case, a risk of collision exists, the message being received by the two communicating elements having a same given interface identifier.

It should be noted that, unlike a communication mode in a configured communication network, the network addresses of the source and destination communicating elements are not decompressed and then recompressed according to the context when they transit through a network equipment unit. In a different manner, the messages are transmitted while preserving their full compression mode, with or without omission of an identifier.

The addressing mode of point-to-point type can, for example, be used to communicate with a communicating element by making use of a configuration device. After its connection at a physical link 26, the configuration device is able to dialogue with the communicating elements present on this physical link. It can, for example, programme a communicating element by sending it a message containing configuration data.

When the addressing mode indicator extracted in the step 122 indicates a multicast addressing mode, the message header includes the address of the source communicating element, in the form of a point-to-point type network address, and a destination network address in the form of a group address.

The group address does not get compressed in respect of the context. It is dependent on the group of communicating elements to which the message is addressed. Only the source address is compressed. As stated previously, the network prefix not being known, the network address of the source communicating element is fully compressed and only the interface identifier of the source communicating element is transmitted in the header of the message.

According to one particular mode of implementation of the communication method, all the address fields of the network address of the source communicating element can be omitted. The Interface identifier IID not transmitted is deduced from the physical address.

When the message indicates a multicast addressing mode, the first receiving element extracts from the received message, in the step 124' of obtaining of the destination network element identifier, the group address. The step 124' of obtaining the identifier is therefore carried out without decompression of the network address.

Then, in the step 126', it compares this identifier to all of the addresses of multicast groups to which it has subscribed in order to determine whether it is the recipient of the message, these addresses being for example saved and stored in the memory storage 44 of its network interface.

If one of the saved and stored group addresses is identical to the extracted identifier, the first element is the recipient of the message and the step 126' is followed by the step 128 of processing the message.

The filtering or retransmission step 130 for filtering or retransmitting of the received message, without performing address decompression and re-compression, follows the step 126' or step 128.

In this addressing mode, communication over the whole of the communication network 14 is possible when all of the communicating elements present on the communication network are subscribed to the multicast group address.

When the first communicating element is a network equipment unit 22, 24 which is not configured, in a preferential manner, in this addressing mode, it is arranged so as to act as a concentrator, that is to say for retransmitting, on one of its ports, all of the messages received on the other port.

The first receiving communicating element may, in certain configurations, respond to the source communicating element (step 132).

When a communicating element receives a message, it has two channels for responding to the source communicating element of the message, the point-to-point channel and the multicast channel.

If the source and destination communicating elements are not on the same given physical link, no response is possible in point-to-point mode. In effect, given that network equipment units behave like filtres, no messages can pass through the latter in point-to-point mode. On the other hand, if the two source and destination communicating elements belong to the same given physical link, a response is possible in point-to-point mode.

A response is also possible by using the multicast addressing mode. The response will not be sent to the source element of the message in particular but to all of the communicating elements present on the communication network by using a global group address.

As the first communicating element is not configured, a response implements the formatting of the message header with compression of addresses.

As explained with reference to FIG. 7, the header of a message includes a field 106 that is suitable to indicate the maximum number of "hops" HLIM between network equipment units that a message can perform. In an advantageous manner, this field makes it possible to limit the dissemination of the message within the communication network.

Advantageously, any communicating element of the network is capable of communicating at least with all the communicating elements forming part of the same given local sub-network by using the communication protocol, prior to complete formatting of the network addresses.

Advantageously, the configuration of the various connected home automation equipment units and the diagnostics may be carried out thanks to this communication mode prior to the complete configuration of the communication network.

Advantageously, the controller 42 of a network interface 40 of a communicating element uses a same given network stack, that is suitable both for communications in unconfigured mode and for communications in configured mode.

In an advantageous manner, the method according to the invention makes possible communication in multicast mode within a communication network or part of an unconfigured communication network. In addition, the communication is not limited to the physical link or to a local link but may have a range beyond the physical link, over the entire communication network.

According to one particular feature of the invention, the compressed point-to-point address defined in the communication network or the unconfigured part of the network is expressed in the same manner when the network or the part of the network is configured. This provides the ability to preconfigure the communicating elements so that they have identical and usable addresses prior to and after configuration of the communication network. Thus, the application software of the communicating elements thus configured can function in the same manner prior to and after configuration of the communication network without reprogramming.

The invention claimed is:

1. A communication method implemented in a home automation system for a building, the home automation system comprising a plurality of communicating elements comprising home automation equipment units and network equipment units, the communicating elements being connected to an unconfigured part of a communication network, each communicating element being designed so as to communicate according to a predefined communication protocol, and having a physical address and a network address comprising a network prefix divided into a plurality of addressing fields, at least one addressing field of which is not filled in, each network address additionally also containing a part of the physical address of the communicating element, the communication protocol using messages conveyed between a source home automation equipment unit and at least one destination home automation equipment unit, with each message including a header, the method comprising the steps, operationally implemented by a first home automation equipment unit, consisting of:

receiving a message comprising a compressed header containing a first indication field of a destination network address and a second indication field indicating a fully compressed source network address, the compressed message header also indicating an addressing mode from among a point-to-point mode and a multicast mode, obtaining from the header received, without decompression of the source network address and/or the destination network address, of a destination network element identifier, a comparison step operationally implemented by the first home automation equipment unit, for comparing the destination network element identifier to a predetermined identifier stored by the first home automation equipment unit, wherein the method comprises an addressing mode determination and when the addressing mode is of point-to-point type, the destination network address indication field indicates a fully compressed destination network address and, during the comparison step, the predetermined identifier is an interface identifier that identifies the first home automation equipment unit, determining whether the first home automation equipment unit is the recipient of the message based on the result of the comparison, and processing of the message received as a function of the result of the determination.

2. The communication method according to claim 1, wherein the fully compressed network destination address is an empty field, the destination network element identifier is deduced from the physical address of the destination home automation equipment unit and the interface identifier of the first home automation equipment unit is equal to the physical address of the first home automation equipment unit.

3. The communication method according to claim 1, further including a filtering step of filtering the message, with the filtering step being operationally implemented by a network equipment unit.

4. The communication method according to claim 1, wherein the source home automation equipment unit is a configuration device, the message including the configuration data in order to configure the first home automation equipment unit.

5. The communication method according to claim 1, wherein, when the addressing mode is of the multicast type, the destination network element identifier is a first group address and wherein the predetermined identifier is a second group address to which the first home automation equipment unit is subscribed.

6. The communication method according to claim 5, including a message communication step of communicating the message received in multicast mode without modification of the header fields relating to the destination network address and the source network address, the communication step being operationally implemented by a network equipment unit.

7. The communication method according to claim 6, wherein the communication step includes the formatting of the message header by an insertion of an indicator indicating a maximum number of hops between network equipment units that the message can perform.

8. The communication method according to claim 1, wherein the compressed source network address is an empty field.

9. The communication method according to claim 1, comprising, after a connection from the unconfigured part of the communication network to a configured communication network, preliminary steps of:

requesting in order to obtain a network address for the first home automation equipment unit;

in the event of no response to the request, and prior to the obtaining of a network address of the first home automation equipment unit, communication using a full address compression mode, enabling the first home automation equipment unit to communicate with at least one second home automation equipment unit.

10. A home automation system for a building that includes a plurality of communicating elements comprising home automation equipment units and network equipment units, the communicating elements being connected to an unconfigured part of a communication network, each communicating element being arranged so as to communicate according to a predefined communication protocol and having a physical address and a network address comprising a network prefix divided into a plurality of address fields of which at least one address field is not filled-in, each network address containing part of the physical address of the communicating element, the communication protocol using messages conveyed between a source home automation equipment unit and at least one destination home automation equipment units, each message comprising a header, wherein a first home automation equipment unit is arranged for:

receiving a message comprising a compressed header, the header containing a first indication field of a destination network address and a second indication field indicating a fully compressed source network address, the compressed message header also indicating an addressing mode from among a point-to-point mode and a multicast mode, obtaining from the header received, without decompressing the source network address and/or the destination network address, a destination network element identifier, a comparison step operationally implemented by the first home automation equipment unit, for comparing the destination network element identifier to a predetermined identifier stored by the first home automation equipment unit, determining the addressing mode and when the addressing mode is of point-to-point type, the destination network address indication field indicates a fully compressed destination network address and, during the comparison step, the predetermined identifier is an interface identifier that identifies the first home automation equipment unit, determining whether the first home automation equipment unit is the recipient of the message, and processing the message received based on the result of the determination.

11. A communication method implemented in a home automation system for a building, the home automation system comprising a plurality of communicating elements comprising home automation equipment units and network equipment units, the communicating elements being connected to an unconfigured part of a communication network, each communicating element being designed so as to communicate according to a predefined communication protocol, and having a physical address and a network address comprising a network prefix divided into a plurality of addressing fields, at least one addressing field of which is not filled in, each network address additionally also containing a part of the physical address of the communicating element, the communication protocol using messages conveyed between a source home automation equipment unit and at least one destination home automation equipment unit, with each message including a header;

the method comprising the steps, operationally implemented by a first home automation equipment unit, consisting of:

receiving a message comprising a compressed header containing a first indication field of a destination network address and a second indication field indicating a fully compressed source network address;

obtaining from the header received, without decompression of the source network address and/or the destination network address, of a destination network element identifier, and determining whether the first home automation equipment unit is the recipient of the message;

processing of the message received as a function of the result of the determination, further comprising, after a connection from the unconfigured part of the communication network to a configured communication network, preliminary steps of:

requesting in order to obtain a network address for the first home automation equipment unit; and in the event of no response to the request, and prior to the obtaining of a network address of the first home automation equipment unit, communication using a full address compression mode, enabling the first home automation equipment unit to communicate with at least one second home automation equipment unit.

12. The communication method according to claim 11, wherein the compressed source network address is an empty field.

13. The communication method according to claim 11, wherein the source home automation equipment unit is a configuration device, the message including the configuration data in order to configure the first home automation equipment unit.

* * * * *